July 24, 1923.
W. L. HAWES
FLOAT CONTROLLED VALVE
Filed June 20, 1921
1,462,599
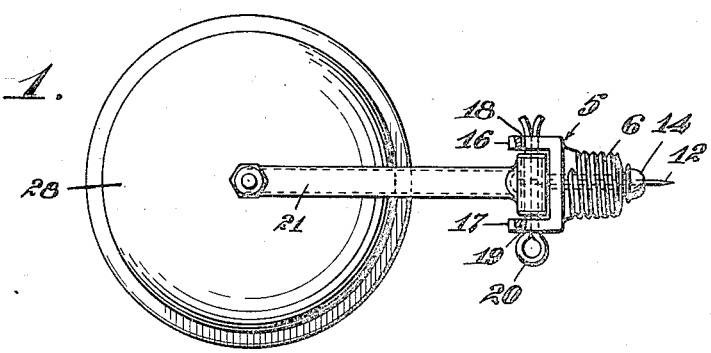
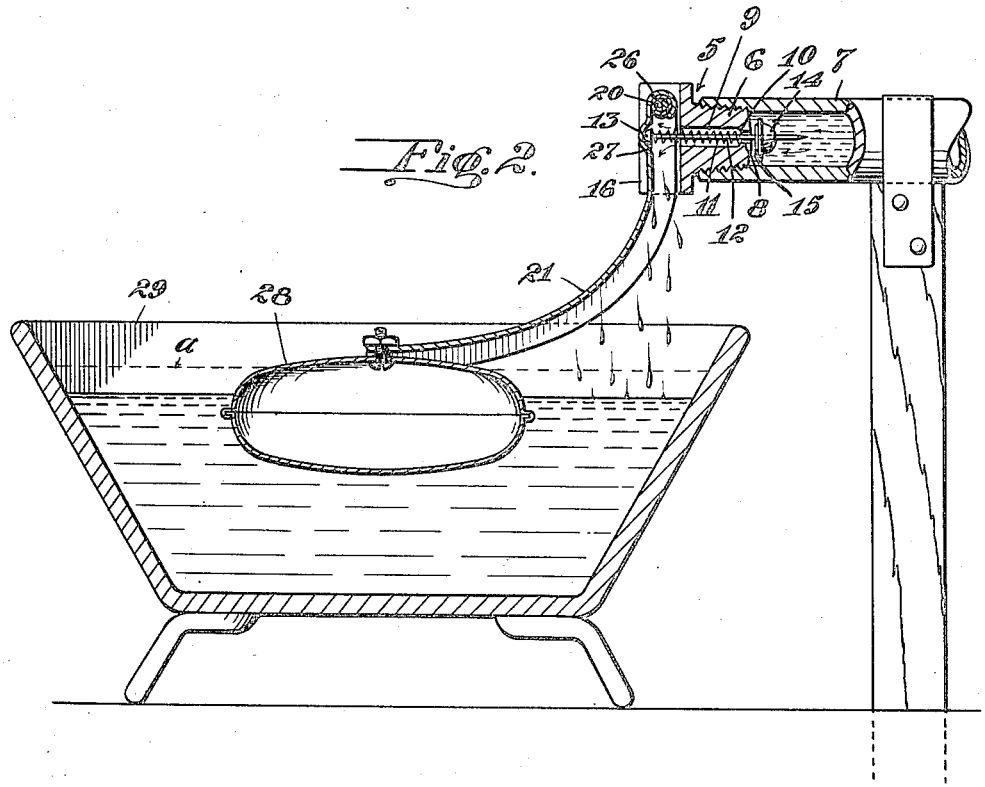
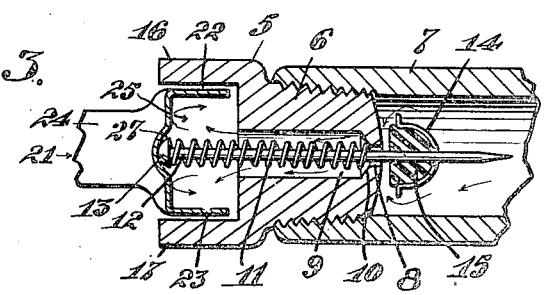
Inventor
William L. Hawes;
By
Attorney Patented July 24, 1923.

1,462,599

UNITED STATES PATENT OFFICE.

WILLIAM L. HAWES, OF BURBANK, CALIFORNIA.

FLOAT-CONTROLLED VALVE.

Application filed June 20, 1921. Serial No. 478,892.

*To all whom it may concern:*

Be it known that I, WILLIAM L. HAWES, a citizen of the United States, residing at Burbank, in the county of Los Angeles and State of California, have invented new and useful Improvements in Float-Controlled Valves, of which the following is a specification.

This invention relates to a float controlled valve, and particularly pertains to a valve which is especially adapted for use in poultry fountains for maintaining a substantially uniform level of water in a basin.

An object of this invention is to provide a valve of the above character which is simple in construction and adapted to be manufactured at small cost, is durable and not liable to get out of order, but in which the parts may be readily removed and replaced and easily repaired when occasion requires.

Another object is to provide a construction whereby proper seating of the valve and complete cut off of the flow of water will be insured.

A further object is to provide a means for confining the jet discharged from the valve to prevent its spreading and to cause it to drip into the basin.

Other objects will appear hereinafter.

The invention is illustrated in the accompanying drawings, in which:

Figure 1 is a plan view of the valve and float.

Figure 2 is a view in vertical section illustrating the application of the invention.

Figure 3 is an enlarged horizontal section as seen on the line 3—3 of Figure 2.

More specifically, 5 indicates the valve casing having a nipple 6 which is externally threaded and is adapted to be screwed into the end of a supply pipe 7, preferably disposed in a horizontal position. The inner end of the nipple 6 is convex in form and provided with a port 8 communicating with a discharge passage 9 opening at the outer end of the nipple. A shoulder 10 is formed at the juncture of port 8 and passage 9 and serves as a seat for a coil spring 11 wound around a valve stem 12 and bearing against a head 13 formed on the outer end of the latter. The valve stem 12 extends through the passage 9 and port 8 and projects beyond the inner end of the nipple and affixed on the projecting inner end portion of the stem is a cup-shaped cap 14 opening toward the nipple and in which is mounted a gasket 15 formed of rubber or similar material and adapted to seat on the end of the nipple to close the port 8 under action of the spring 11. The stem 12, spring 11, cap 14 and gasket 15 constitutes a normally closed inwardly opening valve which opens against water pressure in the pipe 7.

Formed on the outer end of the nipple is a pair of parallel flanges 16 and 17 provided with aligned openings 18 and 19 adjacent their upper ends to receive a demountable pin 20, here shown as comprising a cotter pin forming a pivotal support for a depending outwardly curved arm 21. The arm 21 is formed with channel or U-shaped cross section, that is, with parallel side flanges 22 and 23 on a connecting wall portion 24 to form a channel 25 on the inner and underside of the arm. The upper end of the wall 24 is bent around a sleeve 26 through which the pin 20 extends and the portion of the arm below the sleeve extends between the flanges 16 and 17 on the valve casing with the channel 25 opening opposite the outer end of the discharge passage 9. The inturned upper end of the arm forms a closure for the channel 25 above the discharge passage 9 and with the wall 24 and flanges 22 and 23 co-operating with the flanges 16 and 17 constitute a shield or guard for confining liquid ejected from the discharge passage to prevent spraying of the liquid and to direct it downwardly, as indicated in Figure 2.

Formed on the wall 24 opposite the discharge opening 9 is a socket 27 in which the head 13 of the valve stem 12 is adapted to seat, so that when the upper portion of the arm is moved inwardly and caused to bear on the valve stem to open the valve, the outer end of the stem will be held against shifting so that the valve will be maintained in substantially on center, and thus insure proper seating of the valve; this construction obviating the use of any guides for the valve stem other than its short and loose support in the port 8. The lower portion of the arm 21 is extended substantially horizontal and is fitted with a float 28 which may be of any suitable construction.

In the application and operation of the invention, the basin or trough 29 is positioned beneath the valve to receive the drip from the latter and arranged with the float 28 therein in such manner that when the liquid in the basin reaches a level, as indicated by the dotted line *a* in Figure 2, the arm 21 will be swung outward sufficiently to permit the spring 11 to move the valve 15 against the nipple and close the discharge port 8. When the liquid level falls the float will move downward therewith and swing the upper portion of the arm rearwardly, so as to press against the stem 12 in opposition to the spring 11 and move the valve gasket 15 inwardly against the water pressure to open the port 8 and permit discharge of water which will flow through the port 8 and passage 9 and be discharged into the channel 25 and thence will be directed downwardly to the basin.

When it is desired to clean the valve the arm 21 may be swung upwardly into a vertical position to give access to the valve stem, or if desired the cotter pin 20 may be removed and the arm thus detached. When the valve parts become worn they may be readily removed and replaced; the cap 14 being adapted to be pried from the stem so that the latter may be removed and replaced to permit renewal of the spring 11 and the gasket 15.

I claim:

1. In a float controlled valve, a valve casing having a discharge passage, a valve seating on one end of said casing, a stem on which said valve is mounted projecting through the passage and terminating beyond the other end of the casing, a spring on said stem acting to normally maintain the valve closed to seal said discharge passage, an arm pivoted on said casing above the stem and extending downwardly to abut the stem having a socket in which the end of the stem may seat to maintain the stem substantially on center when the arm abuts thereagainst, and a float on said arm adapted to be acted on by a liquid to raise the arm to permit the valve to close and tending to rock the arm downwardly to open the valve.

2. In a float controlled valve, a valve casing having a discharge passage, a spring pressed valve normally closing said passage, an arm pivoted on said casing above the passage adapted on downward movement to open the valve; said arm serving as a guard to deflect the discharge from said valve.

3. In a float controlled valve, a valve casing having a discharge passage, a spring pressed valve normally closing said passage, an arm pivoted on said casing above the passage adapted on downward movement to open the valve and spaced from the discharge end of the passage and having a downwardly leading channel on its inner side opening opposite the discharge end of the valve; said arm serving as a guard to deflect the discharge from said valve.

WILLIAM L. HAWES.